United States Patent
Park

(10) Patent No.: US 8,872,871 B2
(45) Date of Patent: Oct. 28, 2014

(54) LASER SCANNING UNIT AND IMAGE FORMING APPARATUS INCLUDING THE SAME

(71) Applicant: Samsung Electronics Co., Ltd., Suwon-si (KR)

(72) Inventor: Gi-sung Park, Hwaseong (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 13/875,615

(22) Filed: May 2, 2013

(65) Prior Publication Data

US 2014/0118808 A1 May 1, 2014

(30) Foreign Application Priority Data

Nov. 1, 2012 (KR) .................. 10-2012-0123088

(51) Int. Cl.
*B41J 2/435* (2006.01)
*B41J 2/47* (2006.01)
*G02B 26/12* (2006.01)
*G03G 15/04* (2006.01)
*G02B 26/10* (2006.01)

(52) U.S. Cl.
CPC ........ *G03G 15/04036* (2013.01); *G02B 26/127* (2013.01); *G02B 26/10* (2013.01); *G02B 26/125* (2013.01); *G02B 26/124* (2013.01); *G02B 26/12* (2013.01)
USPC ......................................... 347/234; 347/248

(58) Field of Classification Search
USPC ......... 347/229–231, 234, 235, 241, 243, 244, 347/248–250, 256, 258–261; 359/201.2–202.1, 207.1, 216.1–217.1
See application file for complete search history.

(56) References Cited

U.S. PATENT DOCUMENTS

| | | | | | |
|---|---|---|---|---|---|
| 4,720,632 | A | * | 1/1988 | Kaneko | .................. 250/235 |
| 6,185,027 | B1 | * | 2/2001 | Kamikubo | ............. 359/207.1 |
| 7,050,209 | B2 | * | 5/2006 | Kato | .................. 359/204.2 |

FOREIGN PATENT DOCUMENTS

| | | | | | |
|---|---|---|---|---|---|
| JP | 2002341271 | A | * | 11/2002 | ......... G02B 26/10 |
| JP | 2002350753 | A | * | 12/2002 | ......... G02B 26/10 |

* cited by examiner

*Primary Examiner* — Hai C Pham
(74) *Attorney, Agent, or Firm* — Staas & Halsey LLP

(57) ABSTRACT

A light scanning unit includes: a light source emitting a light beam according to an image signal; a light deflector deflecting and scanning the light beam emitted from the light source; and a synchronization detection optical system comprising a synchronization detection sensor detecting a synchronization signal by receiving a portion of the light beam that is deflected and scanned by the light deflector and a synchronization detection lens disposed between the light deflector and the synchronization detection sensor, wherein the synchronization detection lens is an anamorphic lens in which refractive power in a first direction and refractive power in a second direction different from the first direction are different, and wherein the first direction of the synchronization detection lens is inclined with respect to a main scanning direction in which a light beam incident on the synchronization detection lens is scanned.

21 Claims, 8 Drawing Sheets

LASER SCANNING UNIT AND IMAGE FORMING APPARATUS INCLUDING THE SAME

CROSS-REFERENCE TO RELATED APPLICATIONS

This application claims the benefit of Korean Patent Application No. 10-2012-0123088, filed on Nov. 1, 2012, in the Korean Intellectual Property Office, the disclosure of which is incorporated herein in its entirety by reference.

BACKGROUND

1. Field

The present disclosure relates to a light scanning unit and an image forming apparatus including the same, and more particularly, to a light scanning unit with an improved structure including a synchronization detection system for detecting a horizontal synchronization signal, and an image forming apparatus including the light scanning unit.

2. Description of the Related Art

Light scanning units, which scan light emitted from a light source onto a predetermined area, are used in various apparatuses and devices, such as electrophotographic image forming apparatuses, scanning display devices, or the like.

Since the light scanning units form images by using scanned light, it is important to determine starting and end positions of scanning, and thus the light scanning units include a synchronization detection system for horizontally synchronizing an image.

For example, in electrophotographic image forming apparatuses, such as a laser beam printer, a digital photocopier, or a multi-functional printer (MFP), a light scanning unit forms an electrostatic latent image by scanning a light beam on a photoconductive drum. The formed electrostatic latent image is developed as a development image by using a developer, such as a toner, and the development image is transferred to a printing medium. In such an image forming apparatus, if a scanning position of the light beam scanned on the photoconductive drum is different for each scanning line, an image shift occurs, and a position where colors overlap with each other to form a color image is moved. Accordingly, in order to realize high-resolution images, a synchronization detection system which minimizes variation in timing of a scanning starting position is needed.

SUMMARY

Additional aspects and/or advantages will be set forth in part in the description which follows and, in part, will be apparent from the description, or may be learned by practice of the invention.

The present disclosure provides a light scanning unit in which variation in a scanning starting position due to surface collapse of a light deflecting surface of a light deflector, and an image forming apparatus including the light scanning unit.

According to one aspect, there is provided a light scanning unit including: a light source emitting a light beam according to an image signal; a light deflector deflecting and scanning the light beam emitted from the light source; and a synchronization detection optical system including a synchronization detection sensor detecting a synchronization signal by receiving a portion of the light beam that is deflected and scanned by the light deflector and a synchronization detection lens disposed between the light deflector and the synchronization detection sensor, wherein the synchronization detection lens is an anamorphic lens in which refractive power in a first direction and refractive power in a second direction different from the first direction are different, and wherein the first direction of the synchronization detection lens is inclined with respect to a main scanning direction in which a light beam incident on the synchronization detection lens is scanned.

When viewed along a sub-scanning cross-section that is orthogonal to the main scanning direction, the light beam emitted from the light source may be obliquely incident on a deflection surface of the light deflector. An angle $\Delta\theta$ between the first direction of the synchronization detection lens and the main scanning direction may be determined by an incident angle $\alpha$ and an incident angle $\beta$ of the light beam respectively proceeding to the synchronization detection lens in the main scanning direction and the sub-scanning direction with respect to the light deflector, the angle $\Delta\theta$ being independent of a degree of a surface collapse of the light deflector.

The angle $\Delta\theta$ between the first direction of the synchronization detection lens and the main scanning direction may be greater than the incident angle $\beta$ of the light beam in the sub-scanning direction with respect to the light deflector.

The angle $\Delta\theta$ between the first direction of the synchronization detection lens and the main scanning direction may be expressed by the following equation:

$$\Delta\theta = \arctan(\tan\alpha \cdot \tan\beta). \qquad \text{<Equation>}$$

The synchronization detection sensor may have a rectangular detection surface, and a width direction of the detection surface may be inclined at the angle $\Delta\theta$ expressed by the above equation.

The incident angle $\beta$ of the light beam in the sub-scanning direction with respect to the light deflector may be in a range from 0 to 10 degrees. The incident angle $\beta$ of the light beam in the sub-scanning direction with respect to the light deflector may be in a range from 2 to 4 degrees.

The angle $\Delta\theta$ between the first direction of the synchronization detection lens and the main scanning direction may be in a range from 3 to 20 degrees.

The synchronization detection sensor may have a rectangular detection surface, and a width direction of the detection surface is inclined with respect to the main scanning direction. The first direction of the synchronization detection lens and the width direction of the detection surface may be parallel to each other. Alternatively, a width direction of the detection surface may be inclined with respect to the main scanning direction.

The first direction of the synchronization detection lens may be orthogonal to an optical axis of the synchronization detection lens, and the second direction of the synchronization detection lens may be orthogonal to both the optical axis of the synchronization detection lens and the first direction.

Refractive power of the synchronization detection lens in the second direction may be greater than refractive power of the synchronization detection lens in the first direction. The synchronization detection lens may image the light beam on the detection surface of the synchronization detection sensor in a sub-scanning direction by the refractive power in the second direction.

When viewed along a sub-scanning cross-section that is orthogonal to the main scanning direction, the synchronization detection optical system may have a conjugation relation with respect to a deflection surface of the light deflector and a detection surface of the synchronization detection sensor.

At least one of external surfaces of the anamorphic lens may be orthogonal to the main scanning direction, and the first direction of the anamorphic lens may be inclined with respect to the at least one external surface that is orthogonal to the main scanning direction. At least one of external surfaces of the anamorphic lens may be orthogonal to the first direction, and the at least one of external surfaces that is orthogonal to the first direction may be inclined with respect to the main scanning direction.

The light source may include first and second light sources respectively emitting first and second light beams, wherein the first and second light beams are incident on a deflection surface of the light deflector at different angles when viewed along a sub-scanning cross-section that is orthogonal to the main scanning direction, and wherein the synchronization detection optical system includes at least one of a first synchronization detection optical system detecting a synchronization signal of the first light beam and a second synchronization detection optical system detecting a synchronization signal of the second light beam. Furthermore, the light source may further include third and fourth light sources respectively emitting third and fourth light beams, wherein the third and fourth light beams are incident on a deflection surface of the light deflector that is different from the deflection surface whereby the first and second light beams are deflected, at different angles when viewed along a sub-scanning cross-section that is orthogonal to the main scanning direction, and wherein the synchronization detection optical system includes at least one of a third synchronization detection optical system detecting a synchronization signal of the third light beam and a fourth synchronization detection optical system detecting a synchronization signal of the fourth light beam.

The synchronization detection optical system may be disposed at a starting end of a scanning line of light that is deflected and scanned by the light deflector.

The light scanning unit may further include an incident optical system disposed between the light source and the light deflector. For example, the incident optical system may include at least one of a collimating lens that allows the light beams emitted from the light sources to be formed as collimated light, an aperture stop that shapes cross-sections of light flux of the light beams emitted from the light sources, and a cylindrical lens that collimates the light beams emitted from the light sources in the sub-scanning direction that is parallel to a rotation axis of the light deflector.

The light scanning unit may further include an imaging optical system that forms the light beam that is deflected and scanned by the light deflector, on a scanned surface.

According to one aspect, there is provided an electrophotographic image forming apparatus including: a photoconductive body; a light scanning unit scanning a light beam on a scanned surface of the photoconductive body to form an electrostatic latent image; and a developing unit developing the electrostatic latent image by supplying toner to the electrostatic latent image, wherein the light scanning unit includes: a light source emitting a light beam according to an image signal; a light deflector deflecting and scanning the light beam emitted from the light source; and a synchronization detection optical system including a synchronization detection sensor detecting a synchronization signal by receiving a portion of the light beam that is deflected and scanned by the light deflector and a synchronization detection lens disposed between the light deflector and the synchronization detection sensor, wherein the synchronization detection lens is an anamorphic lens in which refractive power in a first direction and refractive power in a second direction different from the first direction are different, and wherein the first direction of the synchronization detection lens is inclined with respect to a main scanning direction in which a light beam incident on the synchronization detection lens is scanned.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
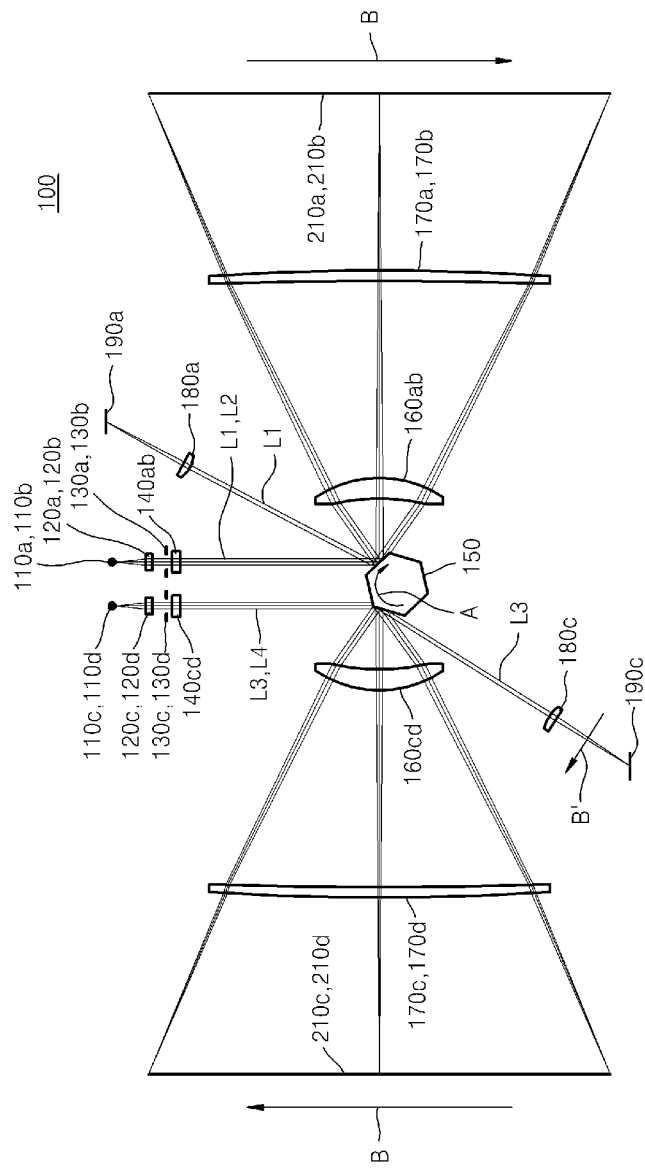
FIG. 1 is a schematic view illustrating an optical arrangement of a light scanning unit, according to one embodiment.

The present disclosure will now be described more fully with reference to the accompanying drawings, in which exemplary embodiments are shown. In the drawings, like reference numerals denote like elements, and the thicknesses of layers and regions are exaggerated for clarity. As used herein, the term "and/or" includes any and all combinations of one or more of the associated listed items. Expressions such as "at least one of," when preceding a list of elements, modify the entire list of elements and do not modify the individual elements of the list.

Figure 2:
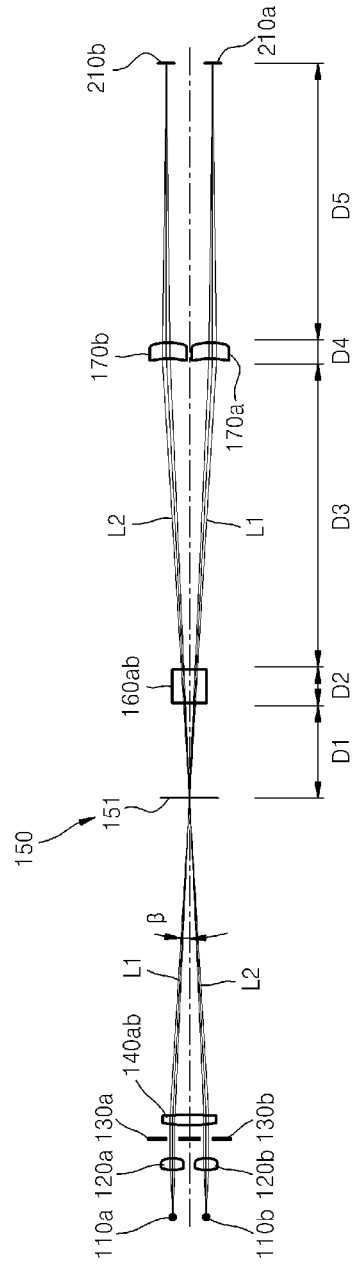
FIG. 2 is a schematic view illustrating an optical arrangement of the light scanning unit of FIG. 1 on a sub-scanning plane from a light source to a scanned surface.
Figure 3:
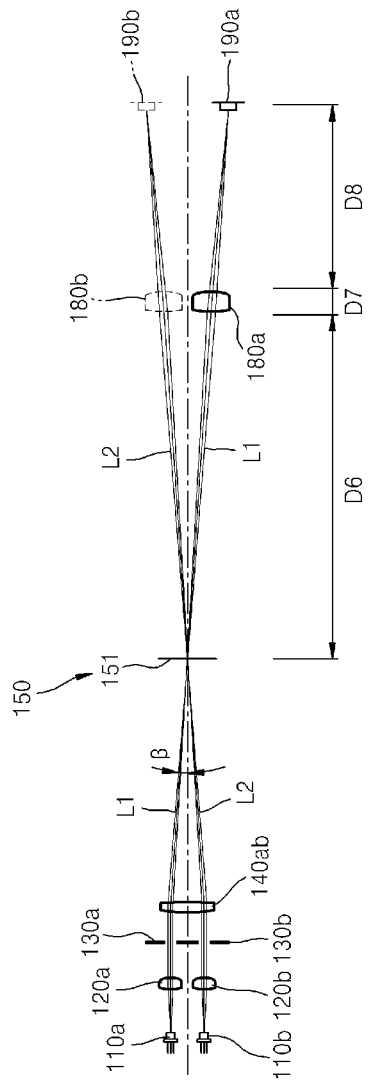
FIG. 3 is a schematic view illustrating an optical arrangement of the light scanning unit of FIG. 1 on a sub-scanning plane from the light source to a synchronization detection sensor.

FIG. 1 is a schematic view illustrating an optical arrangement of a light scanning unit 100 on a main scanning plane. FIG. 2 is a schematic view illustrating an optical arrangement of the light scanning unit 100 of FIG. 1 on a sub-scanning plane from a light source to scanned surfaces 210a and 210b. FIG. 3 is a schematic view illustrating an optical arrangement of a synchronization detection optical system in the light scanning unit 100 of FIG. 1 on a sub-scanning plane. Referring to FIGS. 2 and 3, a reference numeral 150 denotes a light deflector, and here, to simplify a light path, reflective deflection of light by the light deflector 150 is neglected.

In this specification, a main scanning direction refers to a deflection direction in which first through fourth light beams L1, L2, L3, and L4 are deflected and scanned by rotation A of the light deflector 150. Viewing from scanned surfaces 210a, 210b, 210c, and 210d, a direction B in which light is deflected and scanned by the light deflector 150 may be regarded as a main scanning direction. Also, when viewing from the synchronization detection optical system, for example, from a third synchronization detection sensor 190c, a direction B' may be regarded as a main scanning direction.

In addition, a main scanning plane refers to a plane on which each of the light beams first through fourth L1, L2, L3, and L4 is placed when the first through fourth light beams L1, L2, L3, and L4 are deflected and scanned by rotation A of the light deflector 150. The main scanning plane for each of the first through fourth light beams L1, L2, L3, and L4 is simultaneously parallel to each proceeding direction of the first through fourth light beams L1, L2, L3, and L4 and the main scanning direction, and is orthogonal to a rotation axis of the light deflector 150. As will be described later, the light scanning unit 100 according to the current embodiment of the present invention includes an inclination optical system, and thus strictly speaking, the first through fourth light beams L1, L2, L3, and L4 have different main scanning planes with respect to one another; but considering that they are symmetrical, an optical system of the light scanning unit 100 placed on one main-scanning plane in FIG. 1 is illustrated for convenience of description.

A sub-scanning direction is a normal direction of the main scanning plane, which corresponds to a direction in which scanned surfaces 210a, 210b, 210c, and 210d move according to rotation of photoconductive drums 210 (FIG. 12) as will be described later. That is, the sub-scanning direction is perpendicular to both the proceeding direction of the first through fourth light beams L1, L2, L3, and L4 and the main scanning direction B or B'.

A sub-scanning plane is a plane that is orthogonal to the main scanning direction and is parallel to both the proceeding direction of the first through fourth light beams L1, L2, L3, and L4 and the sub-scanning direction. In FIGS. 2 and 3, an optical system of the light scanning unit 100 on the common sub-scanning plane with respect to the first light beam L1 and the second light beam L2 is illustrated.

Referring to FIGS. 1 through 3, the light scanning unit 100 includes four, first through fourth light sources 110a, 110b, 110c, and 110d which respectively emit four first through fourth light beams L1, L2, L3, and L4. As the first through fourth light sources 110a, 110b, 110c, and 110d, laser diodes may be used. The first through fourth light sources 110a, 110b, 110c, and 110d may emit light beams that are modulated according to an image signal corresponding to image information of black (K), magenta (M), yellow (Y), and cyan (C) colors.

The four first through fourth light beams L1, L2, L3, and L4 emitted from the four first through fourth light sources 110a, 110b, 110c, and 110d are deflected by the one light deflector 150 to be scanned. The light deflector 150 may be, for example, a rotational polygonal mirror including a plurality of reflection surfaces that rotate with respect to a rotational axis, that is, deflection surfaces. Alternatively, the light deflector 150 may be a microelectromechanical systems (MEMS) mirror.

Among the four, first through fourth light sources 110a, 110b, 110c, and 110d, the first and second light sources 110a and 110b are arranged parallel in a main scanning direction, and the light sources 110c and 110d may be arranged parallel in a sub-scanning direction. That is, viewing from the main scanning plane as in FIG. 1, the first light source 110a and the second light source 110b may be arranged to overlap, and the third light source 110c and the fourth light source 110d may be arranged to overlap. Also, the first and second light sources 110a and 110b may be symmetrically arranged with respect to the third and fourth light sources 110c and 110d with the light deflector 150 therebetween.

An incident optical system may be disposed on a light path between the first through fourth light sources 110a, 110b, 110c, and 110d and the light deflector 150. The incident optical system may include at least one of four collimating lenses 120a, 120b, 120c, and 120d, four aperture stops 130a, 130b, 130c, and 130d, and two cylindrical first and second lenses 140ab and 140cd which are respectively disposed on the light path. The collimating lenses 120a, 120b, 120c, and 120d are condensing lenses that allow the light beams emitted from the light sources to be formed as collimated light or convergent light. The aperture stops 130a, 130b, 130c, and 130d shape cross-sections of light flux of the first through fourth light beams L1, L2, L3, and L4 (i.e., a diameter and a shape thereof). The first and second cylindrical lenses 140ab and 140cd are anamorphic lenses that collimate the first through fourth light beams L1, L2, L3, and L4 in a direction corresponding to the sub-scanning direction to form the first through fourth light beams L1, L2, L3, and L4 into an almost linear image on a deflection plane of the light deflector 150. The first cylindrical lens 140ab may be used for the first and second light beams L1 and L2 which are incident separately and parallel in the sub-scanning direction, and the second cylindrical lens 140cd may be used for the third and fourth light beams L3 and L4 which are incident separately and parallel in the sub-scanning direction. Alternatively, cylindrical lenses may also be respectively provided for the first through fourth first through fourth light beams L1, L2, L3, and L4. Also, the collimating lenses 120a, 120b, 120c, and 120d and the first and second cylindrical lenses 140ab and 140cd may be integrally formed such that a light flux is focused in a sub-scanning direction through a single lens, and form the light flux as collimated light or convergent light in the main scanning direction. While the aperture stops 130a, 130b, 130c, and 130d being arranged between the collimating lenses 120a, 120b, 120c, and 120d and the first and second cylindrical lenses 140ab and 140cd are described above, the aperture stops 130a, 130b, 130c, and 130d may also be arranged at a different position in the incident optical system, for example, between the first through fourth light sources 110a, 110b, 110c, and 110d and the collimating lenses 120a, 120b, 120c, and 120d or between the first and second cylindrical lenses 140ab and 140cd and the light deflector 150.

The incident optical system as described above may be arranged such that four first through fourth light beams L1, L2, L3, and L4 emitted from the four first through fourth light sources 110a, 110b, 110c, and 110d are obliquely incident on a deflection surface 151 of the light deflector 150. Furthermore, as illustrated in FIGS. 2 and 3, the incident optical system may be designed such that the first light beam L1 and the second light beam L2 are symmetrically incident on the deflection surface 151 of the light deflector 150 when viewing along a sub-scanning cross-section from among the four first through fourth light sources 110a, 110b, 110c, and 110d. In a similar manner, the incident optical system may be designed such that the third light beam L3 and the fourth light beam L4 are symmetrically incident on another deflection surface 151 of the light deflector 150 when viewed along a sub-scanning cross-section.

An incident angle $\beta$ of the first light beam L1 emitted from the first light source 110a on a sub-scanning cross-section with respect to the deflection surface 151 of the light deflector 150 may be within a range from 0 to 10 degrees, preferably, in a range from 2 to 4 degrees. Likewise, an incident angle $\beta$ of the second light beam L2 emitted from the second light source 110b on a sub-scanning cross-section with respect to the deflection surface 151 of the light deflector 150 may be within a range from 0 to 10 degrees, preferably, in a range from 2 to 4 degrees. If an incident angle β of the first through fourth light beams L1, L2, L3, and L4 is great, the first through fourth light beams L1, L2, L3, and L4 may be easily separated when they are deflected and scanned by the light deflector 150, but an imaging optical system may have a complicated optical configuration. Accordingly, the incident angle β of the first through fourth light beams L1, L2, L3, and L4 may be determined according to required optical specifications.

As the incident optical system is an inclined optical system as described above, the light scanning unit 100 may be able to scan a plurality of light beams by using the single light deflector 150, and thus the light scanning unit 100 and a color image forming apparatus having a compact size may be formed to thereby reduce material costs.

An imaging optical system may be disposed on a light path between the light deflector 150 and the scanned surfaces 210a, 210b, 210c, and 210d. The imaging optical system images the first through fourth light beams L1, L2, L3, and L4 that are deflected and scanned by the light deflector 150 on the scanned surfaces 210a, 210b, 210c, and 210d. The imaging optical system may include aspherical lenses which have characteristics for correcting the first through fourth light beams L1, L2, L3, and L4 to be scanned onto the scanned surfaces 210a, 210b, 210c, and 210d at the same velocity.

For example, the imaging optical system may include two first scanning lenses 160ab and 160cd and four second scanning lenses 170a, 170b, 170c, and 170d disposed on each light path of the first through fourth light beams L1, L2, L3, and L4. Here, the two first scanning lenses 160ab and 160cd have refractive power of almost zero (0) in a sub-scanning direction, and the four second scanning lenses 170a, 170b, 170c, and 170d may be formed to have most of the refractive power in the sub-scanning direction required in an imaging optical system. One of the first scanning lenses 160ab and 160cd, the first scanning lens 160ab, may be commonly used for the first and second light beams L1 and L2 which are deflected and scanned separately and parallel in the sub-scanning direction, and the other first scanning lens 160cd may be commonly used for the third and fourth light beams L3 and L4 which are deflected and scanned separately and parallel in the sub-scanning direction.

The second scanning lenses 170a, 170b, 170c, and 170d may be arranged such that a vertex (central point) thereof is deflected in the sub-scanning direction with respect to an optical axis. That is, the second scanning lenses 170a, 170b, 170c, and 170d may be arranged such that the first through fourth light beams L1, L2, L3, and L4 pass through while being deflected in the sub-scanning direction. For example, according to a design example which will be described in detail later with reference to FIG. 1, the second scanning lenses 170a, 170b, 170c, and 170d may be arranged such that a vertex thereof is deflected by 4.7 mm in the sub-scanning direction. By arranging the inclined optical system at a deflected position, scanning line curvature characteristics on the scanned surfaces 210a, 210b, 210c, and 210d may be improved, and an effective surface of incident and exit surfaces of the second scanning lenses 170a, 170b, 170c, and 170d may be reduced.

While the two first scanning lenses 160ab and 160cd are commonly used for the four first through fourth light beams L1, L2, L3, and L4 in the current embodiment, first scanning lenses may also be respectively provided for the four first through fourth light beams L1, L2, L3, and L4. Also, while the imaging optical system according to the current embodiment consists of two scanning lenses for each light path, the imaging optical system may consist of one scanning lens or three or more scanning lenses for each light path.

A reflection mirror (not shown) which may appropriately adjust a light path may be further included inside the imaging optical system or interposed between the imaging optical system and the scanned surfaces 210a, 210b, 210c, and 210d.

A synchronizing detection optical system for detecting a synchronization signal of the first through fourth light beams L1, L2, L3, and L4 that is deflected and scanned by the light deflector 150 is provided. The synchronization detection optical system includes a first synchronization detection lens 180a and a first synchronization detection sensor 190a disposed on a light path of the first light beam L1 that is deflected and scanned by the light deflector 150.

As illustrated in FIG. 1, the first synchronization detection lens 180a and the first synchronization detection sensor 190a may be disposed at a starting end where main scanning starts along a scanning line that is deflected and scanned on a predetermined deflection surface 151 of the light deflector 150. Accordingly, the first synchronization detection sensor 190a may detect a synchronization signal that indicates a start of a scanning line of the first light beam L1.

The first light beam L1 and the second light beam L2 are deflected and scanned by the light deflector 150 while overlapping with each other when viewed along the main scanning plane as illustrated in FIG. 1, and thus the second light beam L2 may be synchronized with the first light beam L1 by using a synchronization signal detected by using the first synchronization detection sensor 190a. Alternatively, as illustrated in FIG. 3, the synchronization detection optical system may further include a second synchronization detection lens 180b and a second synchronization detection sensor 190b that are disposed on a light path of the second light beam L2 that is deflected and scanned by the light deflector 150. The second synchronization detection lens 180b and the second synchronization detection sensor 190b may have substantially the same configuration as the first synchronization detection lens 180a and the first synchronization detection sensor 190a, respectively. Likewise, if the first synchronization detection lens 180a and the second synchronization detection sensor 190b are additionally included, a more accurate synchronization operation may be performed with respect to the second light beam L2 by detecting a synchronization signal of the second light beam L2 by using the second synchronization detection sensor 190b.

Also, as the first light beam L1 and the third light beam L3 are symmetrically arranged with the light deflector 150 therebetween, the third light beam L3 may be synchronized by using a synchronization signal detected by using the first synchronization detection sensor 190a. Alternatively, as illustrated in FIG. 1, the synchronization detection optical system may further include a third synchronization detection lens 180c and a third synchronization detection sensor 190c that are disposed on a light path of the third light beam L3 that is deflected and scanned by the light deflector 150. Here, the third synchronization detection lens 180c and the third synchronization detection sensor 190c may have substantially the same configuration as the first synchronization detection lens 180a and the second synchronization detection sensor 190b described above, except for an inclination angle Δθ. Likewise, if the third synchronization detection lens 180c and the third synchronization detection sensor 190c are additionally included, a more accurate synchronization operation may be performed by detecting a synchronization signal of the third light beam L3 by using the third synchronization detection sensor 190c. Also, a fourth synchronization detection lens (not shown) and a fourth synchronization detection sensor (not shown) may be further included with respect to the fourth light beam L4.

Next, a synchronization detection optical system will be described in detail. The configurations of a synchronization detection lens and a synchronization detection sensor are substantially the same for any of the first through fourth first through fourth light beams L1, L2, L3, and L4, and thus hereinafter, a light beam will be labeled L, a synchronization detection lens will be labeled with a reference numeral 180, and a synchronization detection sensor will be labeled with a reference numeral 190.

Figure 4:
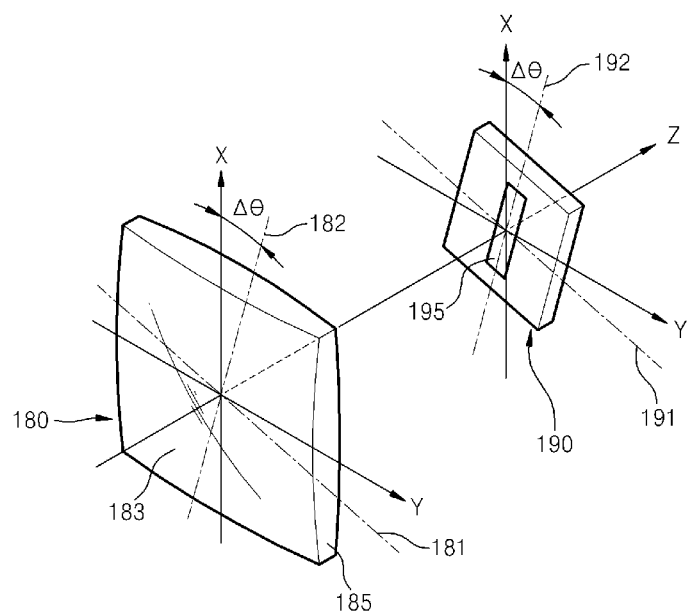
FIG. 4 is a schematic view illustrating an optical arrangement of the synchronization detection optical system of the light scanning unit of FIG. 1.

FIG. 4 is a schematic view illustrating an optical arrangement of the synchronization detection optical system of the light scanning unit 100 of FIG. 1. Referring to FIG. 4, the synchronization detection lens 180 images a light flux for detecting a synchronization signal, on a detection surface 195 of the synchronization detection sensor 190 in order to adjust timing of a scanning starting position of a light beam L that is deflected and scanned by the light deflector 150.

The synchronization detection lens 180 may be designed such that the deflection surface 151 of the light deflector 150 and the detection surface 195 of the synchronization detection sensor 190 have a conjugation relation with each other. In other words, the synchronization detection lens 180 may be formed as illustrated in FIG. 3 such that when a light beam L is formed to an image on the deflection surface 151 of the light deflector 150 with respect to a sub-scanning cross-section, the image be formed on the detection surface 195 of the synchronization detection sensor 190.

The synchronization detection lens 180 may be at least one anamorphic lens having different refractive powers in a first direction 181 and a second direction 182 that is different from the first direction 181. The refractive power of the synchronization detection lens 180 in the second direction 182 may be greater than the refractive power of the synchronization detection lens 180 in the first direction 181 so that the light beam L is imaged on the detection surface 195 of the synchronization detection sensor 190 at least in a sub-scanning direction. The first direction 181 is orthogonal to an optical axis of the synchronization detection lens 180 (i.e., a Z-direction), and may be inclined at an angle of Δθ in a clockwise direction with respect to a main scanning direction (Y-direction). The second direction 182 is orthogonal to both the first direction 181 and the optical axis, and may be inclined at an angle of Δθ in a clockwise direction with respect to the sub-scanning direction (X-direction). The angle Δθ may be, as will be expressed later in Equation 9, approximately an angle β and an angle α at which the light beam L is incident on the light deflector 150. Here, referring to FIG. 1, an incident angle α1 in a main scanning direction with respect to the first light beam L1 and an incident angle α2 in a main scanning direction with respect to the second light beam L2 may be different from each other.

The synchronization detection sensor 190 is a device which generates a synchronization signal by detecting a portion of the light beam L1 that is deflected and scanned by the light deflector 150, and may be, for example, a photodiode, a photosensor IC, or the like. The detection surface 195 of the synchronization detection sensor 190 may have a rectangular shape that extends in a predetermined direction. Here, the synchronization detection sensor 190 may be disposed such that a width direction 191 of the detection surface 195 is inclined in a clockwise direction with respect to the main scanning direction Y, and a length direction 192 of the detection surface 195 is inclined with respect to a sub-scanning direction X. The length direction 192 of the detection surface 195 refers to a direction along which a longer side of the rectangular shape extends. The inclination angle of the synchronization detection sensor 190 may be the same as the inclination angle Δθ of the synchronization detection lens 180.

The external shape of the synchronization detection lens 180 may be a square (or rectangular) shape when viewed along an incident surface 183 (or exit surface) in order to facilitate alignment of the synchronization detection lens 180 in horizontal and vertical directions. In this case, the first direction 181 of the synchronization detection lens 180 may not be orthogonal to an external surface 185 but may be inclined at an angle of Δθ. The external surface 185 of the synchronization detection lens 180 may be mounted in a housing (not shown) of the light scanning unit 100 while being orthogonal to a main scanning direction (Y-direction), and since this method is typical, a conventional housing and a conventional lens holder (not shown) may be used without any change.

Hereinafter, an operation of the light scanning unit 100 according to an embodiment will be described with reference to FIGS. 1 through 8.

Figure 5:
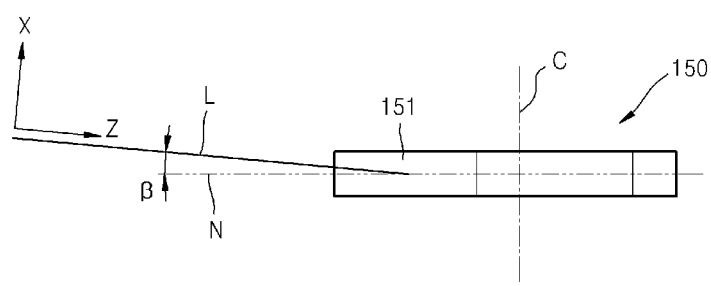
FIG. 5 is a schematic view of a light ray that is obliquely incident on a light deflector on a sub-scanning plane.
Figure 6:
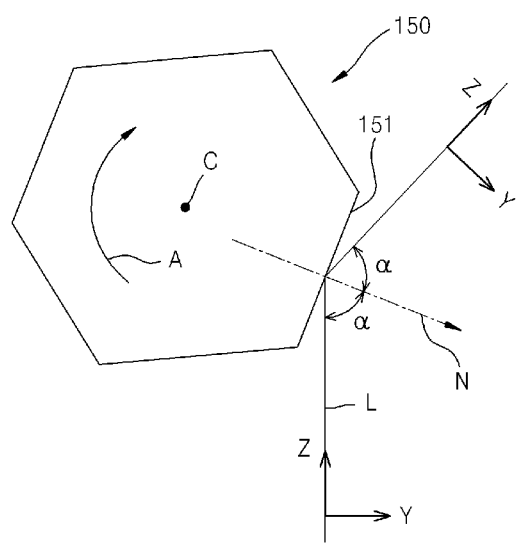
FIG. 6 is a schematic view of a light ray that is reflectively deflected by a light deflector on a sub-scanning plane.

FIG. 5 is a schematic view of a light beam L that is obliquely incident on the light deflector 150 in a sub-scanning direction at an incident angle β on a sub-scanning plane, and FIG. 6 is a schematic view of a light beam L that is reflectively deflected on a main scanning plane at an incident angle α in a main scanning direction. Referring to FIG. 1, the incident angle in the main scanning direction may be an angle α1 (Table 1) in a case when the first light beam L1 is directed toward the first synchronization detection sensor 190a or an angle α3 (Table 1) in a case when the third light beam L3 is directed toward the third synchronization detection sensor 190c.

Figure 7:
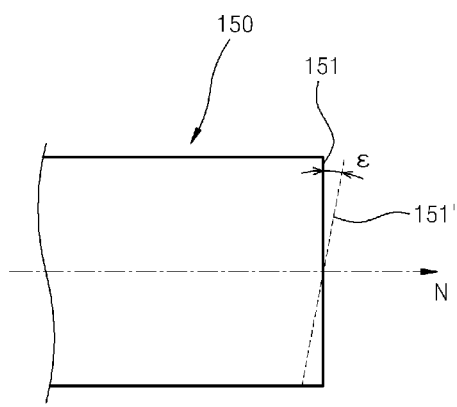
FIG. 7 illustrates a surface collapse in the light deflector in the light scanning unit of FIG. 1.
Figure 8:
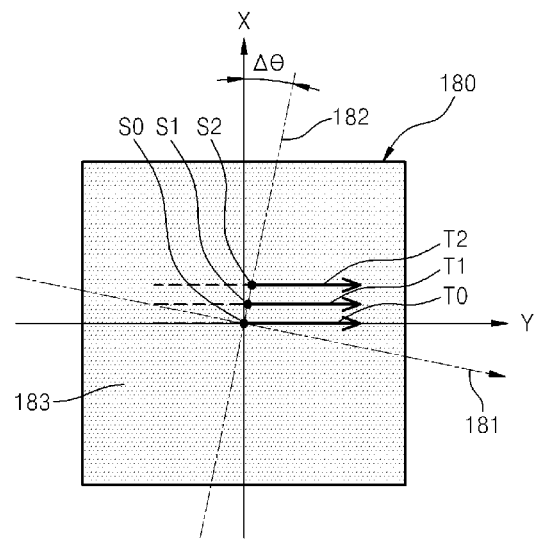
FIG. 8 illustrates a track of a light beam scanned by the synchronization detection system of FIG. 4.

FIG. 7 illustrates a surface collapse in the light deflector 150 in the light scanning unit 100 of FIG. 1, and FIG. 8 illustrates a track of a light beam L scanned by the synchronization detection optical system of FIG. 4. In FIGS. 5 and 6, N refers to a normal that is perpendicular to the deflection surface 151 of the light deflector 150.

Assuming a light ray vector P of the light beam L that is incident on the light deflector 150, if there is no surface collapse of the deflection surface 151 of the light deflector 150, a light ray vector Q(0) of the light beam L reflected by the deflection surface 151 may be expressed as in Equation 1 below.

$$Q(0) = Rx(\alpha - 180) \cdot Mz \cdot Rx(\alpha) \cdot Ry(\beta) \cdot P, \qquad \text{[Equation 1]}$$

where the light ray vector P may be expressed as in Equation 2 below.

$$P = \begin{vmatrix} 0 \\ 0 \\ 1 \end{vmatrix} \qquad \text{[Equation 2]}$$

$Rx(\alpha)$ is an operator for rotating the light ray vector P with respect to an x-axis by an angle α, and may be expressed as in Equation 3 below.

$$Rx(\alpha) = \begin{vmatrix} 1 & 0 & 0 \\ 0 & \cos\alpha & -\sin\alpha \\ 0 & \sin\alpha & \cos\alpha \end{vmatrix} \qquad \text{[Equation 3]}$$

Likewise, Ry(β) is an operator for rotating the light ray vector P with respect to a y-axis by an angle β, and may be expressed as in Equation 4 below.

$$Ry(\beta) = \begin{vmatrix} \cos\beta & 0 & \sin\beta \\ 0 & 1 & 0 \\ -\sin\beta & 0 & \cos\beta \end{vmatrix} \quad \text{[Equation 4]}$$

Also, Mz is an operator that converts just a sign of a z component of the light ray vector P, that is, an operator which reflects the light ray vector P with respect to a z-axis on the deflection surface 151, and may be expressed as in Equation 5 below.

$$Mz = \begin{vmatrix} 1 & 0 & 0 \\ 0 & 1 & 0 \\ 0 & 0 & -1 \end{vmatrix} \quad \text{[Equation 5]}$$

Although the deflection surface 151 of the light deflector 150 is assumed to be vertical to a bottom surface of the housing of the light scanning unit 100, a surface collapse, which refers to inclination of the deflection surface 151 during the operation of the light deflector 150, occurs due to a manufacturing tolerance of the light deflector 150 or fluctuation generated during the operation of the light deflector 150. If a surface collapse of the deflection surface 151 of the light deflector 150 occurs at an angle ϵ as illustrated in FIG. 7, a light ray vector Q(ϵ) of the light beam L reflected by the deflection surface 151 is expressed as in Equation 6 below.

$$Q(\epsilon) = Rx(\alpha - 180) \cdot Ry(\beta = \epsilon) \cdot Mz \cdot Ry(\epsilon) \cdot Rx(\alpha) \cdot Ry(\beta) \cdot P \quad \text{[Equation 6]}$$

Here, an amount of movement of the light ray vectors Q(0) and Q(ϵ) on an incident surface of the synchronization detection lens 180 due to the surface collapse of the light deflector 150 is given as in Equation 7 below.

$$\Delta Q(\varepsilon) = 2\varepsilon \begin{vmatrix} \cos\alpha\cos\beta \\ \sin\alpha\sin\beta \\ -\cos\alpha\sin\beta \end{vmatrix} + O(\varepsilon^2) \quad \text{[Equation 7]}$$

Referring to Equation 7, a movement amount Δx of the light beam L in an X-axis direction and a movement amount Δy of the light beam L in a Y-axis direction are given as in Equations 8 and 9 below, respectively.

$$\Delta x = Q_1(\epsilon) - Q_1(0) \approx 2\epsilon \cdot \cos\alpha \cos\beta$$

$$\Delta y = Q_2(\epsilon) - Q_2(0) \approx 2\epsilon \cdot \sin\alpha \sin\beta \quad \text{[Equation 8]}$$

$$\Delta\theta = \arctan\frac{\Delta y}{\Delta x} \approx \arctan\frac{\sin\alpha\sin\beta}{\cos\alpha\cos\beta} = \arctan(\tan\alpha \cdot \tan\beta) \quad \text{[Equation 9]}$$

Equation 8 indicates that the movement amount Δx of the light beam L in the X-axis direction and the movement amount Δy of the light beam L in the Y-axis direction are approximately proportional to the surface collapse angle ϵ of the light deflector 150. Equation 9 indicates that the angle Δθ whereby the light beam L is moved due to the surface collapse of the light deflector 150 is determined to be the angle β in the sub-scanning direction and the angle α in the main scanning direction, at which the light beam L is incident on the light deflector 150, and that the surface collapse angle ϵ hardly affects the angle Δθ.

FIG. 8 illustrates tracks T1 and T2 of the light beam L on the incident surface of the synchronization detection lens 180 when a surface collapse occurs on the deflection surface 151 of the light deflector 150. A track T0 denotes a case where no surface collapse of the light deflector 150 occurs.

As illustrated in FIG. 4, when passing through a central portion of the synchronization detection lens 180, the light beam L1 reaches the detection surface 195 of the synchronization detection sensor 190, and thus it may be understood that when the light beam L is scanned along the track T0, a synchronization signal is generated at a position S0.

When a small degree of surface collapse of the light deflector 150 occurs, the light beam L is scanned along the track T1 while being inclined at the angle Δθ due to the movement of the light beam L. Accordingly, the position S0 at which no surface collapse occurs is moved to a position S1 due to the surface collapse. If more surface collapse occurs in the light deflector 150, the light beam L is moved to a track T2, and the position S0 is changed to a position S2. As described above, the detection surface 195 of the synchronization detection sensor 190 is inclined at the angle Δθ, and thus, even when the track of the light beam L is changed by the surface collapse of the light deflector 150, a synchronization signal is generated at the position S1 or the position S2. Also, the synchronization detection lens 180 is designed such that the first direction 181 and the second direction 182 along which the refractive power of the synchronization detection lens 180 are different are inclined at the angle Δθ with respect to each other, and thus, even when a surface collapse of the deflection surface 151 occurs in the light deflector 150 as described above, the position S1 or the position S2 is moved just from the central point of the synchronization detection lens 180 (i.e., the position S0) along the second direction 182, and accordingly, an optical performance of the synchronization detection lens 180 does not deteriorate due to changes in the track (of the light beam L).

As described above, the light beam L is imaged on a deflection surface 151 of the light deflector 150 in a sub-scanning direction by the first and second cylindrical lenses 140ab and 140cd of the incident optical system, and as the deflection surface 151 of the light deflector 150 and the detection surface 195 of the first synchronization detection sensor 190a have a conjugation relationship due to the synchronization detection lens 180, variation in position and timing of scanning start due to the surface collapse of the deflection surface 151 of the light deflector 150 may be further reduced.

Next, specific design data of the light scanning unit 100 according to the current embodiment of the present invention will be described below.

Tables 1 through 3 below show design data of the light scanning unit 100.

TABLE 1

| Structure of Light Scanning Unit | | |
|---|---|---|
| maximum effective angle of view [deg] | θmax | 35.1 |
| effective scanning width [mm] | W | 216 |
| sub-scanning inclination incident angle in light deflector [deg] | β | 3 |
| sub-scanning incident angle of light beam in light deflector in a direction to first synchronization detection lens [deg] | α1 | 73.9 |
| sub-scanning incident angle of light beam in light deflector in a direction to third synchronization detection lens [deg] | α3 | 13.9 |
| wavelength, refractive index | | |
| wavelength used [nm] | λ | 786.5 |
| refractive indices of first and second scanning lenses | N1 | 1.537 |
| refractive index of synchronization detection lens | N2 | 1.486 |
| arrangement of imaging optical system [mm] | | |
| deflection surface of light deflector ~ incident surface of first scanning lens | L1 | 29.2 |
| incident surface of first scanning lens ~ lens exit surface of first scanning lens | L2 | 10 |
| exit surface of first scanning lens ~ incident surface of second scanning lens | L3 | 92.4 |
| incident surface of second scanning lens ~ exit surface of second scanning lens | L4 | 5 |
| exit surface of second scanning lens ~ scanned surface | L5 | 83.2 |
| deflection surface of light deflector ~ incident surface of synchronization detection lens | L6 | 97.5 |
| incident surface of synchronization detection lens ~ exit surface of synchronization detection lens | L7 | 3 |
| exit surface of synchronization lens ~ synchronization detection sensor | L8 | 41 |
| curvature radius of main/sub-scanning of incident surface of synchronization detection lens | R1 | 21 |
| curvature radius of sub-scanning of exit surface of synchronization detection lens | R2 | −43 |

An aspheric shape of an incident surface and an exit surface of the first scanning lenses 160ab and 160cd and the second scanning lenses 170a, 170b, 170c, and 170d may be expressed as in Equation 10 below.

$$z = \frac{C_1|y|^2}{1+\sqrt{1-C_1^2|y|^2}} + \sum_n A_n|y|^n + \frac{C_2|x|^2}{1+\sqrt{1-C_2^2|x|^2}} + \sum_{m,n} E_{mn}|y|^{nm}|x|^n,$$ [Equation 10]

where z denotes a distance from a vertex of a scanning lens in an optical axis direction, and x denotes a distance in a direction perpendicular to an optical axis, and y denotes a distance from the vertex of the scanning lens in a main scanning direction, K denotes a conic constant, $a_n$ denotes an aspherical coefficient in a main scanning direction, and $b_n$ denotes an aspherical coefficient in a sub-scanning direction. Also, $C_1$ denotes an inverse number of a curvature radius R in a main scanning direction, and $C_2$ denotes an inverse number of curvature radius r in a sub-scanning direction. Values of the coefficients expressed by Equation 10 are shown in Tables 2 and 3 below. Coefficients that are not given in Tables 2 and 3 are regarded as zero (0).

TABLE 2

| | | First scanning lens [mm] | | Second scanning lens [mm] | |
|---|---|---|---|---|---|
| | | Incident surface | Exit surface | Incident surface | Exit surface |
| | R(=1/C1) | −1.003E+02 | −5.303E+01 | −1.074E+03 | 3.984E+03 |
| light source side | A1 | 8.443E−03 | 6.768E−03 | 7.463E−04 | 3.834E−03 |
| | A2 | −2.421E−04 | −9.515E−04 | −4.160E−05 | −9.825E−05 |
| | A3 | 3.224E−06 | 3.136E−06 | 1.270E−06 | 1.411E−06 |
| | A4 | 1.748E−06 | 1.133E−06 | 2.606E−08 | −1.753E−07 |
| | A5 | −2.367E−08 | −8.675E−09 | 2.674E−10 | 7.044E−10 |
| | A6 | 2.569E−10 | 4.232E−10 | −2.894E−12 | 5.207E−12 |
| | A7 | 4.416E−12 | 6.741E−13 | 3.884E−14 | 6.494E−14 |
| | A8 | −1.051E−12 | −1.127E−13 | −1.735E−16 | −1.326E−15 |
| | A9 | 8.807E−15 | −7.698E−15 | −7.126E−18 | 3.140E−18 |
| | A10 | 2.230E−16 | 3.454E−17 | 2.867E−20 | −1.849E−20 |
| opposite light source side | A1 | −8.443E−03 | −6.768E−03 | −7.463E−04 | −3.834E−03 |
| | A2 | −2.421E−04 | −9.515E−04 | −4.160E−05 | −9.825E−05 |
| | A3 | −3.224E−06 | −3.136E−06 | −1.270E−06 | −1.411E−06 |
| | A4 | 1.653E−06 | 1.061E−06 | 9.982E−08 | −9.847E−08 |
| | A5 | −1.232E−08 | −2.154E−09 | −9.326E−11 | 8.224E−11 |
| | A6 | 4.586E−10 | 2.825E−10 | 3.267E−12 | 1.380E−11 |
| | A7 | −6.775E−12 | 7.445E−12 | −2.006E−14 | 7.874E−15 |
| | A8 | −1.362E−12 | −2.169E−13 | −9.312E−16 | −1.619E−15 |

TABLE 2-continued

| | | First scanning lens [mm] | | Second scanning lens [mm] | |
|---|---|---|---|---|---|
| | | Incident surface | Exit surface | Incident surface | Exit surface |
| A9 | | 9.029E−16 | −1.612E−14 | −1.463E−18 | 1.304E−18 |
| A10 | | 7.009E−16 | 1.357E−16 | 3.609E−20 | 1.180E−20 |

TABLE 3

| | | Second scanning lens [mm] | |
|---|---|---|---|
| | | incident surface | exist surface |
| light source side | C2 | −1.375E−02 | −4.337E−02 |
| | E02 | 6.449E−05 | −3.143E−03 |
| | E22 | 4.952E−07 | 1.376E−06 |
| | E42 | 1.738E−10 | −6.556E−11 |
| | E62 | −1.801E−14 | 1.462E−14 |
| | E82 | −2.767E−18 | −2.561E−18 |
| | E102 | −1.245E−22 | −3.268E−22 |
| | E04 | 2.243E−05 | 2.654E−05 |
| | E24 | −6.812E−09 | −5.866E−09 |
| | E44 | −9.768E−13 | 3.105E−13 |
| | E64 | −5.610E−17 | −1.914E−16 |
| | E84 | 3.633E−20 | −7.598E−21 |
| | E104 | 4.734E−24 | 8.556E−24 |
| opposite light source side | E02 | 6.449E−05 | −3.143E−03 |
| | E22 | 4.952E−07 | 1.376E−06 |
| | E42 | 1.291E−10 | −8.604E−11 |
| | E62 | −5.163E−15 | 2.032E−14 |
| | E82 | 1.735E−19 | 4.715E−19 |
| | E102 | −3.964E−22 | −5.652E−22 |
| | E04 | 2.243E−05 | 2.654E−05 |
| | E24 | −6.812E−09 | −5.866E−09 |
| | E44 | −1.418E−12 | 3.304E−14 |
| | E64 | 1.049E−16 | −1.231E−16 |
| | E84 | 3.313E−20 | −1.337E−21 |
| | E104 | 2.266E−24 | 7.059E−24 |

In Tables 2 and 3, the aspherical coefficients at the side of the light source and those at the opposite light source side are divided with respect to a central axis of the scanning lenses. That is, referring to FIG. 1, a light beam section $L_{O1}$-Lc close to the first through fourth light sources 110a, 110b, 110c, and 110d from among light beams scanned on the scanned surfaces 210a, 210b, 210c, and 210d corresponds to the light source side, and a light beam section Lc-$L_{O2}$ far from the first through fourth light sources 110a, 110b, 110c, and 110d corresponds to the opposite light source side.

According to the design data of Table 1, in the case of the light beam L1, $\alpha1=73.9°$ and $\beta=3$. Here, when a surface collapse $\epsilon$ of the light deflector 150 is $\epsilon=120$ seconds, light ray vectors $Q(\epsilon)$ and $Q(0)$ of the first light beam L1 reflected by the deflection surface 151 are calculated as shown in Equation 11 below.

$$Q(\varepsilon) = \begin{vmatrix} 0.052658149 \\ 5.86874 \times 10^{-5} \\ 0.998612596 \end{vmatrix}$$

$$Q(0) = \begin{vmatrix} 0.052335956 \\ -1.11022 \times 10^{-16} \\ 0.998629535 \end{vmatrix}$$

[Equation 11]

Here, the movement angle $\Delta\theta$ of the light ray vector of the first light beam L1 on the incident surface of the synchronization detection lens 180 due to the surface collapse of the light deflector 150 is 10.3 degrees according to Equation 11. Accordingly, the first direction 181 and the second direction 182 of the first synchronization detection lens 180a are rotated clockwise by 10.3 degrees, and the first synchronization detection sensor 190a is also rotated in the same manner.

An inclination angle $\Delta\theta$ for the third synchronization detection lens 180c and the third synchronization detection sensor 190c may be calculated with $\alpha3=13.9$ instead of $\alpha1=73.9$.

According to the current embodiment, as the synchronization detection lens 180 and the synchronization detection sensor 190 are rotated in the above-described manner, a variation in a scanning start position due to the surface collapse of the light detector 150 is reduced to the level of 0.02 um. However, a basic detection optical system, which is designed with the same design data but in which the synchronization detection lens 180 and the synchronization detection sensor 190 are not rotated, has a variation in a scanning start position due to the surface collapse of the light detector 150 that amounts to 10.6 um, generating jitter of ¼ dots at 600 dpi and degrading image quality.

Figure 9:
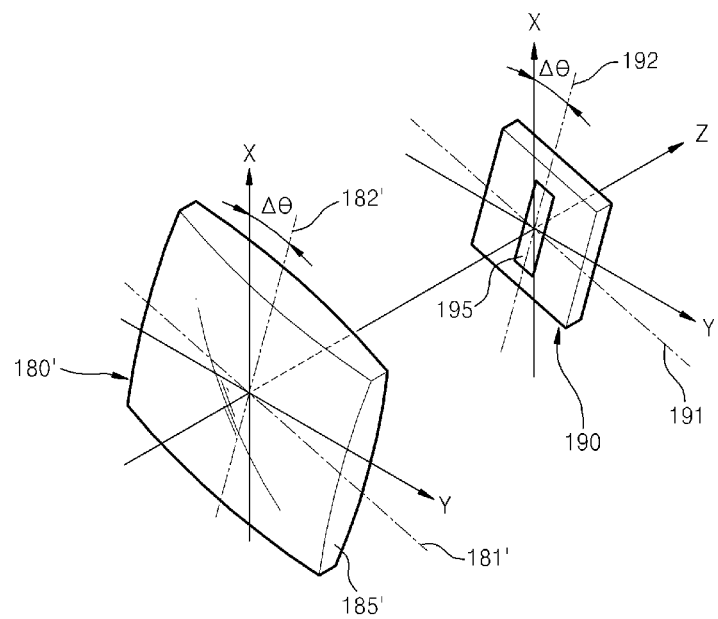
FIG. 9 is a schematic view illustrating an optical arrangement of a synchronization detection system of the light scanning unit of FIG. 1.

FIG. 9 is a schematic view illustrating an optical arrangement of a synchronization detection system of the light scanning unit 100 of FIG. 1.

Referring to FIG. 9, a synchronization detection lens 180' according to the current embodiment of the present invention is a typical anamorphic lens whose first direction 181' is perpendicular to an external surface 185'. However, when the synchronization detection lens 180' is assembled in a housing (not shown) of the light scanning unit 100, the synchronization detection lens 180' is mounted in a rotated state so that the first direction 181' of the synchronization detection lens 180' is inclined at an angle $\Delta\theta$ of with respect to a main scanning direction (Y-direction). An anamorphic lens, which is used in light scanning units, may also be used as the synchronization detection lens 180', and a portion for mounting the synchronization detection lens 180' may be additionally designed such that the synchronization detection lens 180' is mounted while being rotated at an angle of $\Delta\theta$.

The synchronization detection optical system according to the current embodiment is substantially the same as the previous embodiments, except for the outer appearance of the synchronization detection lens 180 (for example, a method of determining the angle $\Delta\theta$ or the arrangement of the synchronization detection sensor 190 are the same). According to the current embodiment, substantially the same effects may be obtained by mounting the synchronization detection lens 180' in a rotated manner.

Figure 10:
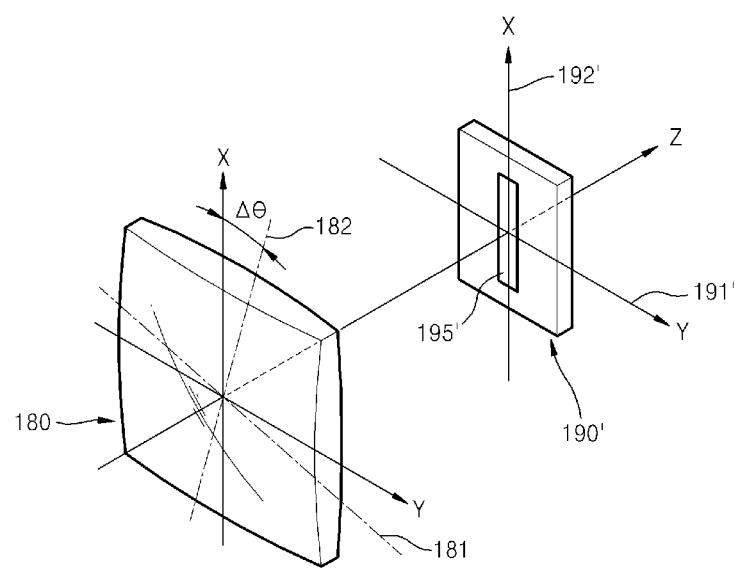
FIG. 10 is a schematic view illustrating an optical arrangement of a synchronization detection system of the light scanning unit of FIG. 1.

FIG. 10 is a schematic view of an optical arrangement of a synchronization detection optical system of the light scanning unit 100 of FIG. 1.

Referring to FIG. 10, a synchronization detection lens 180 is substantially the same as the synchronization detection lens 180 of the embodiment described above with reference to FIGS. 1 through 8. However, here, a width direction 191' of a detection surface 195' of a synchronization detection sensor 190' is set along a main scanning direction Y, and a length direction 192' of the detection surface 195' is set along a sub-scanning direction X. Also in this case, as described above with reference to FIG. 8, the synchronization detection lens 180 is designed such that the first direction 181 and the second direction 182 are inclined with respect to each other at an angle Δθ, and thus, even when a surface collapse of the deflection surface 151 of the light deflector 150 occurs, positions S0, S1, and S2 of the light beam L, which are synchronously detected, move just from the central point of the synchronization detection lens 180 in the second direction 182. Accordingly, a deterioration of an optical performance of the synchronization detection lens 180 according to track variation does not occur.

Figure 11:
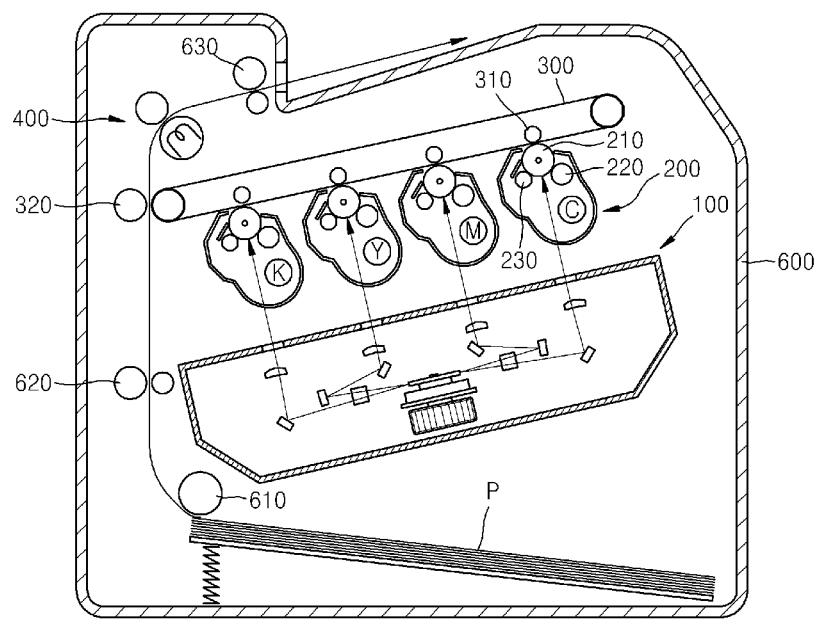
FIG. 11 is a schematic structural diagram of an electrophotographic image forming apparatus including a light scanning unit.

FIG. 11 is a schematic view of an electrophotographic image forming apparatus according to an embodiment. The electrophotographic image forming apparatus illustrated in FIG. 11 is a dry type electrophotographic image forming apparatus which prints color images by using a dry type developing agent (hereinafter, "toner").

The electrophotographic image forming apparatus according to the current embodiment of the present invention may include the laser scanning unit 100, a developing unit 200, an intermediate transfer belt 300, first and second transfer rollers 310 and 320, and a fusing unit 400, which are accommodated in a cabinet 600.

The laser scanning unit 100 is a unit for scanning a plurality of light beams, and may be the laser scanning unit 100 according to the embodiments described above with reference to FIGS. 1 through 10. For example, the light scanning unit 100 may scan four light beams corresponding to black (K), magenta (M), yellow (Y), and cyan (C) colors.

The developing unit 200 may be provided for each color in accordance with a plurality of light beams. For example, the developing unit 200 may be included for each of the black (K), magenta (M), yellow (Y), and cyan (C) colors. The developing unit 200 includes a photoconductive drum 210 for each color, which is an image receptor on which an electrostatic latent image is formed, and a developing roller 220 for developing the electrostatic latent image.

The photoconductive drum 210 is an example of a photoconductor, which includes a photoconductive layer with a predetermined thickness on an external surface of a cylindrical metal pipe. The external surface of the photoconductive drum 210 is a scanning surface. The photoconductive drum 210 is exposed outside the developing unit 200 and is spaced apart by a predetermined distance in a sub-scanning direction. A belt-type photoconductive belt may also be used as a photoconductor instead of the photoconductive drum 210.

A charging roller 230 is disposed on an upstream portion of the outer circumferential surface of the photoconductive drum 210, wherein the outer circumferential surface is exposed by the light scanning unit 100. The charging roller 230 is a charger that contacts the photoconductive drum 210 and revolves to charge a surface thereof to a uniform potential. A charging bias is applied to the charging roller 230. Alternatively, a corona charger (not shown) may be used as the charging roller 230. The developing roller 220 supplies toner to the photoconductive drum 210 by attaching it on its outer circumference. A developing bias for supplying the toner to the photoconductive drum 210 is applied to the developing roller 220. While not shown in FIG. 11, a supplying roller that attaches the toner contained therein to the developing roller 220, a regulating unit for regulating the amount of toner attached on the developing roller 220, and an agitator (not shown) that transports the toner contained therein to the supplying roller and/or the developing roller 220 may be further included in each developing unit 200.

The intermediate transfer belt 300 faces an outer circumferential surface of the photoconductive drum 210 that is exposed outside the developing unit 200. The intermediate transfer belt 300 is an intermediate transcriptional unit for transferring the toner images of the photoconductive drums 210 to a printing medium P. Alternatively, an intermediate transfer drum may be used as the intermediate transfer belt 300. The intermediate transfer belt 300 is driven while contacting the photoconductive drums 210. The four first transfer rollers 310 are disposed to face the photoconductive drums 210 with the intermediate transfer belt 300 therebetween. A first transfer bias is applied to the first transfer roller 310 so that a toner image of the photoconductive drum 210 is transferred to the intermediate transfer belt 300.

The second transfer roller 320 is arranged to face the intermediate transfer belt 300 such that a printing medium P passes through therebetween. A second transfer bias is applied to the second transfer roller 320 such that the toner image of the intermediate transfer belt 300 is transferred to the printing medium P.

An operation of forming a color image according to the above-described configuration will be described below.

The photoconductive drum 210 of each developing unit 200 is charged to a uniform potential by a charging bias applied to the charging roller 230.

The light scanning unit 100, a scanning surface of the photoconductive drum 210 is exposed in a length direction, that is, in a main scanning direction. As the photoconductive drum 210 rotates, the scanning surface moves in a sub-scanning direction, and accordingly, two-dimensional electrostatic latent images corresponding to image information of black (K), magenta (M), yellow (Y), and cyan (C) colors are formed on respective scanned surfaces of the four photoconductive drums 210. Here, the sub-scanning direction is a direction perpendicular to the main scanning direction. The four developing units 200 supply toner of black (K), magenta (M), yellow (Y), and cyan (C) colors to the photoconductive drums 210 to thereby form toner images of black (K), magenta (M), yellow (Y), and cyan (C) colors.

Toner images of the black (K), magenta (M), yellow (Y), and cyan (C) colors formed on the photoconductive drums 210 are overlapped and transferred by the first transfer bias applied to the first transfer rollers 310 to the intermediate transfer belt 300 to form a color toner image.

A final medium that accommodates toner, for example, a printing medium P, is transported by using a pickup roller 610 and a transport roller 620 to be transferred between the intermediate transfer belt 300 and the second transfer roller 320. The color toner image transferred on the intermediate transfer belt 300 is transferred to the printing medium P by the second transfer bias applied to the second transfer roller 320. The toner image on the intermediate transfer belt 300 is transferred to the printing medium P. The color toner image transferred to the printing medium P is maintained on a surface of the printing medium P by electrostatic force. The printing medium P to which the color toner image is transferred is transferred to the fusing unit 400. The color toner image transferred to the printing medium P is fused on the printing medium P by receiving heat and pressure at a fusing nip of the fusing unit 400. The printing medium P with which fusing is completed is discharged out of the electrophotographic image forming apparatus by a discharging roller 630.

According to the light scanning unit and the image forming apparatus including the light scanning unit of the embodiment, a structure of a synchronization detection system is improved to reduce variation in a scanning starting position due to a surface collapse of a light deflector.

While formation of a color image using the electrophotographic image forming apparatus has been described above, the embodiments of the present invention are not limited thereto. For example, when forming a black monochromatic image, the laser scanning unit 100 scans a single light beam, and the developing unit 220 may be provided for a single light beam. Moreover, other components than the laser scanning unit 100 in the image forming apparatus, that is, the developing unit 200, the intermediate transfer belt 300, the first and second transfer rollers 310 and 320, and the fusing unit 400, are of an example of a printing unit that transfers a toner image on a printing medium in an electrophotographic manner, and a conventional printing unit may also be applied in an image forming apparatus according to the present invention.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning unit comprising:
  a light source emitting a light beam according to an image signal;
  a light deflector deflecting and scanning the light beam emitted from the light source; and
  a synchronization detection optical system comprising a synchronization detection sensor detecting a synchronization signal by receiving a portion of the light beam that is deflected and scanned by the light deflector and a synchronization detection lens disposed between the light deflector and the synchronization detection sensor,
  wherein the synchronization detection lens is an anamorphic lens in which refractive power in a first direction and refractive power in a second direction different from the first direction are different, and wherein the first direction of the synchronization detection lens is inclined with respect to a main scanning direction in which a light beam incident on the synchronization detection lens is scanned,
  wherein when viewed along a sub-scanning cross-section that is orthogonal to the main scanning direction, the light beam emitted from the light source is obliquely incident on a deflection surface of the light deflector,
  wherein an angle $\Delta\theta$ between the first direction of the synchronization detection lens and the main scanning direction is determined by an incident angle $\alpha$ and an incident angle $\beta$ of the light beam respectively proceeding to the synchronization detection lens in the main scanning direction and the sub-scanning direction with respect to the light deflector the angle $\Delta\theta$ being independent of a degree of a surface collapse of the light deflector, and
  wherein the angle $\Delta\theta$ between the first direction of the synchronization detection lens and the main scanning direction is expressed by the following equation:

$$\Delta\theta = \arctan(\tan\alpha \cdot \tan\beta). \qquad \text{<Equation>}$$

2. The light scanning unit of claim 1, wherein the angle $\Delta\theta$ between the first direction of the synchronization detection lens and the main scanning direction is greater than the incident angle $\beta$ of the light beam in the sub-scanning direction with respect to the light deflector.

3. The light scanning unit of claim 1, wherein the synchronization detection sensor has a rectangular detection surface, and a width direction of the detection surface is inclined at the angle $\Delta\theta$ expressed by the above equation.

4. The light scanning unit of claim 1, wherein the incident angle $\beta$ of the light beam in the sub-scanning direction with respect to the light deflector is in a range from 0 to 10 degrees.

5. The light scanning unit of claim 4, wherein the incident angle $\beta$ of the light beam in the sub-scanning direction with respect to the light deflector is in a range from 2 to 4 degrees.

6. The light scanning unit of claim 1, wherein the angle $\Delta\theta$ between the first direction of the synchronization detection lens and the main scanning direction is in a range from 3 to 20 degrees.

7. The light scanning unit of claim 1, wherein the synchronization detection sensor has a rectangular detection surface, and a width direction of the detection surface is inclined with respect to the main scanning direction.

8. The light scanning unit of claim 7, wherein the first direction of the synchronization detection lens and the width direction of the detection surface are parallel to each other.

9. The light scanning unit of claim 1, wherein the synchronization detection sensor has a rectangular detection surface, and a width direction of the detection surface is along with the main scanning direction.

10. The light scanning unit of claim 1, wherein the first direction of the synchronization detection lens is orthogonal to an optical axis of the synchronization detection lens, and the second direction of the synchronization detection lens is orthogonal to both the optical axis of the synchronization detection lens and the first direction.

11. The light scanning unit of claim 1, wherein refractive power of the synchronization detection lens in the second direction is greater than refractive power of the synchronization detection lens in the first direction.

12. The light scanning unit of claim 1, wherein the synchronization detection lens images the light beam on the detection surface of the synchronization detection sensor in a sub-scanning direction by the refractive power in the second direction.

13. The light scanning unit of claim 1, wherein when viewed along a sub-scanning cross-section that is orthogonal to the main scanning direction, the synchronization detection optical system has a conjugation relation with respect to a deflection surface of the light deflector and a detection surface of the synchronization detection sensor.

14. The light scanning unit of claim 1, wherein at least one of external surfaces of the anamorphic lens is orthogonal to the main scanning direction, and the first direction of the anamorphic lens is inclined with respect to the at least one external surface that is orthogonal to the main scanning direction.

15. The light scanning unit of claim 1, wherein at least one of external surfaces of the anamorphic lens is orthogonal to the first direction, and the at least one of external surfaces that is orthogonal to the first direction is inclined with respect to the main scanning direction.

16. The light scanning unit of claim 1, wherein the light source comprises first and second light sources respectively emitting first and second light beams,
  wherein the first and second light beams are incident on a deflection surface of the light deflector at different angles when viewed along a sub-scanning cross-section that is orthogonal to the main scanning direction, and
  wherein the synchronization detection optical system comprises at least one of a first synchronization detection optical system detecting a synchronization signal of the first light beam and a second synchronization detection optical system detecting a synchronization signal of the second light beam.

17. The light scanning unit of claim 16, wherein the light source further comprises third and fourth light sources respectively emitting third and fourth light beams,
  wherein the third and fourth light beams are incident on a deflection surface of the light deflector that is different from the deflection surface whereby the first and second light beams are deflected, at different angles when viewed along a sub-scanning cross-section that is orthogonal to the main scanning direction, and
  wherein the synchronization detection optical system comprises at least one of a third synchronization detection optical system detecting a synchronization signal of the third light beam and a fourth synchronization detection optical system detecting a synchronization signal of the fourth light beam.

18. The light scanning unit of claim 1, wherein the synchronization detection optical system is disposed at a starting end of a scanning line of light that is deflected and scanned by the light deflector.

19. The light scanning unit of claim 1, further comprising an incident optical system disposed between the light source and the light deflector.

20. The light scanning unit of claim 1, further comprising an imaging optical system that forms the light beam that is deflected and scanned by the light deflector, on a scanned surface.

21. An electrophotographic image forming apparatus comprising:
  a photoconductive body;
  a light scanning unit scanning a light beam on a scanned surface of the photoconductive body to form an electrostatic latent image; and
  a developing unit developing the electrostatic latent image by supplying toner to the electrostatic latent image,
  wherein the light scanning unit comprises:
    a light source emitting a light beam according to an image signal;
    a light deflector deflecting and scanning the light beam emitted from the light source; and
    a synchronization detection optical system comprising a synchronization detection sensor detecting a synchronization signal by receiving a portion of the light beam that is deflected and scanned by the light deflector and a synchronization detection lens disposed between the light deflector and the synchronization detection sensor,
  wherein the synchronization detection lens is an anamorphic lens in which refractive power in a first direction and refractive power in a second direction different from the first direction are different, and wherein the first direction of the synchronization detection lens is inclined with respect to a main scanning direction in which a light beam incident on the synchronization detection lens is scanned,
  wherein when viewed along a sub-scanning cross-section that is orthogonal to the main scanning direction, the light beam emitted from the light source is obliquely incident on a deflection surface of the light deflector,
  wherein an angle $\Delta\theta$ between the first direction of the synchronization detection lens and the main scanning direction is determined by an incident angle $\alpha$ and an incident angle $\beta$ of the light beam respectively proceeding to the synchronization detection lens in the main scanning direction and the sub-scanning direction with respect to the light deflector, the angle $\Delta\theta$ being independent of a degree of a surface collapse of the light deflector, and
  wherein the angle $\Delta\theta$ between the first direction of the synchronization detection lens and the main scanning direction is expressed by the following equation:

$$\Delta\theta = \arctan(\tan\alpha \cdot \tan\beta). \qquad \text{<Equation>}$$

* * * * *

UNITED STATES PATENT AND TRADEMARK OFFICE
CERTIFICATE OF CORRECTION

PATENT NO. : 8,872,871 B2  
APPLICATION NO. : 13/875615  
DATED : October 28, 2014  
INVENTOR(S) : Gi-sung Park Page 1 of 1

It is certified that error appears in the above-identified patent and that said Letters Patent is hereby corrected as shown below:

In the Claims

Column 19, Line 51, in Claim 1, delete "deflector" and insert -- deflector, --, therefor.

Signed and Sealed this  
Third Day of March, 2015

Michelle K. Lee  
*Deputy Director of the United States Patent and Trademark Office*